United States Patent
Barker

(10) Patent No.: US 10,601,214 B2
(45) Date of Patent: Mar. 24, 2020

(54) METHOD OF CLEARING A FAULT IN A HVDC ELECTRICAL NETWORK

(71) Applicant: GENERAL ELECTRIC TECHNOLOGY GMBH, Baden (CH)

(72) Inventor: Carl David Barker, Walton Stone (GB)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 251 days.

(21) Appl. No.: 15/543,867

(22) PCT Filed: Jan. 15, 2016

(86) PCT No.: PCT/EP2016/050808
§ 371 (c)(1),
(2) Date: Jul. 14, 2017

(87) PCT Pub. No.: WO2016/113406
PCT Pub. Date: Jul. 21, 2016

(65) Prior Publication Data
US 2018/0013280 A1  Jan. 11, 2018

(30) Foreign Application Priority Data
Jan. 16, 2015 (EP) .................................... 15275019

(51) Int. Cl.
*H02H 3/00* (2006.01)
*H02H 3/06* (2006.01)
(Continued)

(52) U.S. Cl.
CPC ............ *H02H 3/066* (2013.01); *H02H 7/262* (2013.01); *H02H 7/268* (2013.01); *H02J 3/36* (2013.01);
(Continued)

(58) Field of Classification Search
None
See application file for complete search history.

(56) References Cited

U.S. PATENT DOCUMENTS

2013/0193766 A1*  8/2013  Irwin .................... H02H 7/268
307/82

FOREIGN PATENT DOCUMENTS

| CN | 102484430 A | 5/2012 |
| CN | 102522732 A | 6/2012 |

(Continued)

OTHER PUBLICATIONS

Extended European Search Report and Opinion issued in connection with corresponding EP Application No. 15275019.6 dated Jun. 29, 2015.

(Continued)

*Primary Examiner* — Stephen W Jackson
(74) *Attorney, Agent, or Firm* — Eversheds Sutherland (US) LLP

(57) ABSTRACT

A method of clearing a fault in a high voltage DC electrical network, including power converters interconnected by a DC power transmission, comprising: detecting a fault in the DC power transmission and reconfiguring each power converter to a fault blocking mode driving the DC fault current towards zero; locating the fault and isolating a faulty portion from a healthy remaining portion; reconfiguring one of the power converters designated as a re-energising power converter from the fault blocking to re-energise the healthy remaining portion; and detecting a rise in the voltage level in the healthy remaining portion above a threshold level and reconfiguring the remaining power converter connected with the healthy remaining portion from the fault blocking to the normal power transmission.

14 Claims, 6 Drawing Sheets

(51) Int. Cl.
*H02H 7/26* (2006.01)
*H02J 3/36* (2006.01)
(52) U.S. Cl.
CPC ......... *H02J 2003/365* (2013.01); *Y02E 60/60* (2013.01)

(56) References Cited

FOREIGN PATENT DOCUMENTS

| CN | 104022494 A | 9/2014 |
|---|---|---|
| WO | 2011/029480 A1 | 3/2011 |
| WO | 2013/174726 A1 | 11/2013 |
| WO | 2013174726 A1 | 11/2013 |

OTHER PUBLICATIONS

International Search Report and Written Opinion issued in connection with corresponding PCT Application No. PCT/EP2016/050808 dated Apr. 21, 2016.

International Preliminary Report on Patentability issued in connection with corresponding PCT Application No. PCT/EP2016/050808 dated Jul. 18, 2017.

Machine Translation and First Office Action and Search issued in connection with corresponding CN Application No. 201680005956.8 dated Jul. 9, 2018.

\* cited by examiner

METHOD OF CLEARING A FAULT IN A HVDC ELECTRICAL NETWORK

BACKGROUND

Embodiments of the invention relate to a method of clearing a fault in a high voltage direct current (HVDC) electrical network.

In power transmission networks alternating current (AC) power is converted to direct current (DC) power for transmission via overhead lines and/or under-sea cables. This conversion to DC power removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. A power converter, such as a voltage source converter, provides the required conversion between AC power and DC power within the network.

A typical such power transmission network includes a plurality of power converters, each of which is connected on one side to a respective AC electrical network and is connected on the other side to a DC electrical network which interconnects it with one or more of the other power converters.

SUMMARY

According to an embodiment of the present invention there is provided a method of clearing a fault in a high voltage DC electrical network including at least three power converters interconnected by at least a first DC power transmission medium, the method comprising the steps of: detecting a fault in the first DC power transmission medium and in response reconfiguring each power converter from a normal power transmission mode to a fault blocking mode to drive the resulting DC fault current flowing in the first DC power transmission medium towards zero; locating the fault in the first DC power transmission medium and isolating a faulty portion of the first DC power transmission medium from a healthy remaining portion of the first DC power transmission medium; reconfiguring at least one of the power converters designated as a re-energising power converter from the fault blocking mode to a re-energising mode to re-energise the healthy remaining portion of the first DC power transmission medium; and detecting a rise in the voltage level in the healthy remaining portion of the first DC power transmission medium above a first threshold level and in response reconfiguring the or each remaining power converter connected with the healthy remaining portion of the first DC power transmission medium from the fault blocking mode to the normal power transmission mode.

Reconfiguring the or each remaining power converter into a normal power transmission mode, i.e. returning the or each remaining power converter to its normal operating condition, in response to a rise in the voltage level in the healthy remaining portion of the first DC power transmission medium does away with the need to rely on telecommunications between oftentimes very widely spaced power converters in order to coordinate a restart of the associated DC electrical network following a fault. Such telecommunications are subject to outage, error and can introduce unnecessary delays, and so the method of the embodiments of the invention results in a more reliable and responsive way of restarting a DC electrical network.

In an embodiment of the invention the at least three power converters are interconnected by first and second DC power transmission mediums, and the step of detecting a fault in the first DC power transmission medium includes detecting a difference between the voltage levels in each of the first and second DC power transmission mediums.

Such features allow the method of the embodiments of the invention to detect a line-to-ground, i.e. a line-to-earth, fault in a DC electrical network in which each of the power converters therein is connected in a symmetrical monopole configuration.

Optionally the at least three power converters are interconnected by first and second DC power transmission mediums, and the step of detecting a fault in the first DC power transmission medium includes detecting a rise in current flowing in each of the first and second DC power transmission mediums.

Such features of the embodiments of the invention allow for the detection of a line-to-ground-to-line fault, or other short-circuit between the first and second DC power transmission mediums, in a DC electrical network in which each of the power converters therein is connected in a symmetrical monopole configuration.

The at least three power converters may be interconnected by only a first DC power transmission medium, and the step of detecting a fault in the first DC power transmission medium may include detecting a rise in current flowing in the first DC power transmission medium.

This combination of features conveniently allows the method of the embodiments of the invention to detect a line-to-ground fault in a DC electrical network in which each of the power converters therein is connected in an asymmetric monopole configuration.

In an embodiment, each of the first and second DC power transmission mediums has at least one energy removal device connected therewith, and after the step of reconfiguring each power converter from the normal power transmission mode to the fault blocking mode to drive the resulting DC fault current flowing in the first DC power transmission medium towards zero, the method includes the step of activating at least one of the energy removal devices connected with the second DC power transmission medium to remove energy from the second DC power transmission medium and thereby reduce the voltage level in the second DC power transmission medium from an overvoltage level following occurrence of the fault to a second threshold level below a normal absolute operating voltage level of the second DC power transmission medium.

Removing energy from the second DC power transmission medium, and thereby reducing the voltage level in the second DC power transmission medium from an overvoltage level to a second threshold level below a normal absolute operating voltage level of the second DC power transmission medium, allows the or each energy removal device to remain configured for conventional operation in which it removes energy from an associated DC power transmission medium when the voltage level thereof fluctuates (during normal operation of the DC electrical network, i.e. in the absence of a specific fault in the DC electrical network) above a safety threshold which is typically 5% to 10% above the normal absolute operating voltage level of the associated DC power transmission. Such a fluctuation in the voltage level normally arises when the energy supplied to the DC electrical network is temporarily greater than the energy being taken out of the DC electrical network.

In an embodiment of the invention the second threshold level is additionally below the first threshold level.

Reducing the voltage level in the second DC power transmission medium to a second threshold level which is also below the first threshold level facilitates subsequent detection of a rise in the voltage level in the second DC power transmission medium above the first threshold level which, in turn, can then act as a trigger to reconfigure the or each of the remaining power converters to their normal power transfer mode following isolation of the fault, and hence permit restarting of the DC electrical network.

Optionally, after the step of activating at least one of the energy removal devices connected with the second DC power transmission medium, the method includes the step of deactivating the or each said energy removal device for a predetermined period of time, the deactivation of the or each said energy removal device coinciding at least in part with the step of locating the fault in the first DC power transmission medium and isolating the faulty portion of the first DC power transmission medium from the healthy remaining portion of the first DC power transmission medium.

Deactivating the or each said energy removal device for a predetermined period of time provides a sufficient period in which the fault can be located and isolated from the remaining DC electrical network before further remedial steps are taken.

In an embodiment of the invention the step of deactivating the or each said energy removal device connected with the second DC power transmission medium for a predetermined period of time, is followed by the step of selectively activating at least one of the energy removal devices connected with the first DC power transmission medium and selectively activating at least one of the energy removal devices connected with the second DC power transmission medium to selectively interconnect the first and second DC power transmission mediums and thereby provide a path via which the voltage levels in the first and second DC power transmission mediums are able to rebalance.

Rebalancing the voltage levels in the first and second DC power transmission mediums is beneficial because this is the normal operating state of the DC electrical network which, in turn, helps to reduce a DC stress at a mid-point, e.g. an AC terminal, of each power converter.

In an embodiment the step of reconfiguring at least one of the power converters designated as a re-energising power converter from the fault blocking mode to the re-energising mode takes place on detection of balanced voltage levels in the first and second DC power transmission mediums.

Such a step helps to ensure that the reduction in DC stress at the mid-point of each power converter has had an opportunity to arise before further steps are taken.

In an embodiment of the invention the step of reconfiguring at least one of the power converters designated as a re-energising power converter from the fault blocking mode to a re-energising mode takes place a predetermined period of time after the fault is detected.

Such a step provides sufficient time after detection of the fault for the fault to be located within the DC electrical network and suitably isolated from the network before further remedial steps are carried out.

Optionally the step of locating a fault in the first DC power transmission medium includes interrogating a plurality of DC protection elements located throughout the electrical network, the DC protection elements being so located throughout the electrical network so as to permit the selective isolation of respective portions of a given DC power transmission medium from one another.

Such interrogation, e.g. by way of assessing the differential protection associated with the various DC protection elements, readily and reliably identifies the location of a fault.

In an embodiment, the step of isolating a faulty portion of the first DC power transmission medium from the healthy remaining portion of the first DC power transmission medium includes the step of operating at least one DC protection element lying adjacent to the faulty portion to electrically separate the said faulty portion from the healthy remaining portion.

Such a step provides ready and reliable isolation of the faulty portion from the healthy remaining portion of the first DC power transmission medium.

The step of isolating a faulty portion of the first DC power transmission medium from the healthy remaining portion of the first DC power transmission medium may additionally include the step of isolating a faulty portion of the second DC power transmission medium from a healthy remaining portion of the second DC power transmission medium by operating at least one DC protection element lying adjacent to the said faulty portion of the second DC power transmission medium to electrically separate the said faulty portion from the healthy remaining portion of the second DC power transmission medium.

Such a step desirably isolates the or each fault in the event of a fault, e.g. a line-to-ground-to-line fault or other short-circuit, between the first and second DC power transmission mediums in a DC electrical network in which each of the power converters therein is connected in a symmetrical monopole configuration.

Optionally, operating the or each said DC protection device takes place once the DC fault current flowing through the corresponding DC power transmission medium has been driven down by the fault-blocking power converters below a safety threshold level.

Such a step permits the use of DC protection devices which are required only to handle a low current throughput, e.g. when opening respective switch contacts, and so the devices can be less complex and less expensive than might otherwise be the case.

BRIEF DESCRIPTION OF THE DRAWINGS

There now follows a brief description of embodiments of the invention, by way of non-limiting example, with reference to the following figures in which.

DETAILED DESCRIPTION

Figure 1:
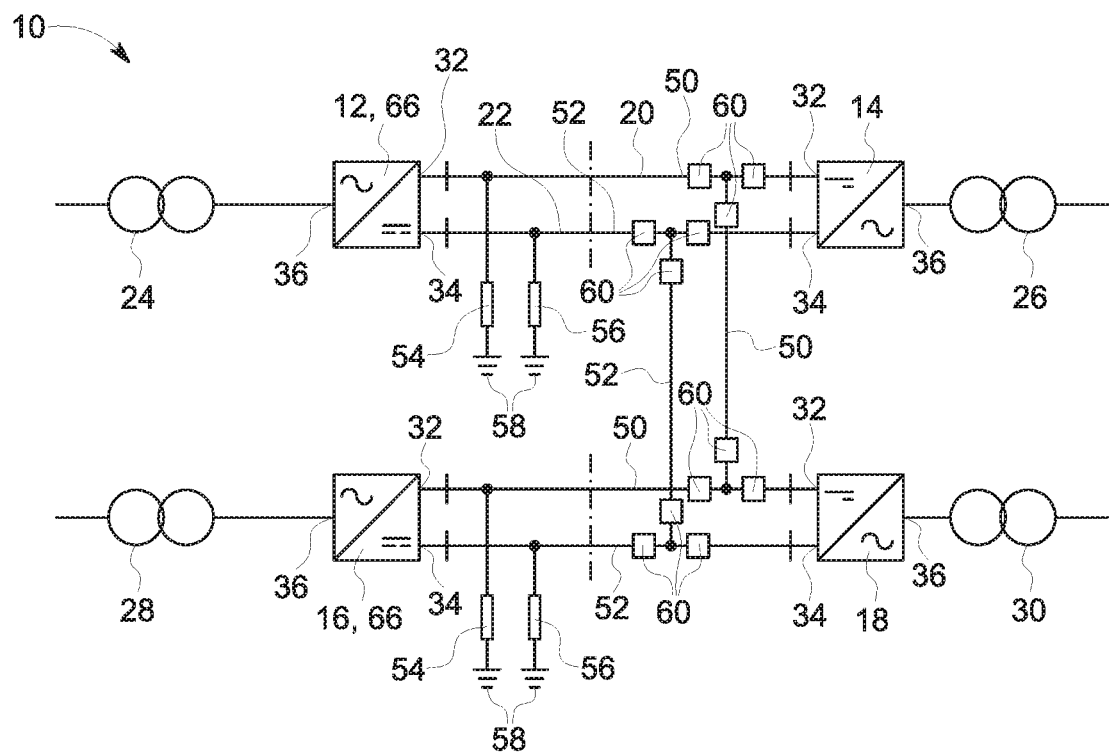
FIG. 1 shows a schematic view of a first DC electrical network in respective of which methods are applicable.

A first DC electrical network is designated generally by reference numeral 10, as shown in FIG. 1.

The first DC electrical network 10 includes first, second, third and fourth power converters 12, 14, 16, 18 which are interconnected with one another by separate first and second DC power transmission mediums 20, 22. The first DC electrical network 10 may also include fewer than or more than four power converters.

Each of the power converters 12, 14, 16, 18 is connected between the first DC electrical network 10 and a respective first, second, third, or fourth AC electrical network 24, 26, 28, 30. In the arrangement shown each of the first and third AC electrical networks 24, 28 is an on-shore network that is connected to existing AC network infrastructure, while each of the second and fourth AC electrical networks 26, 30 is connected to a renewable energy source, such as an off-shore wind farm or other weak AC system. In other network arrangements, however, this need not necessarily be the case.

Figure 2:
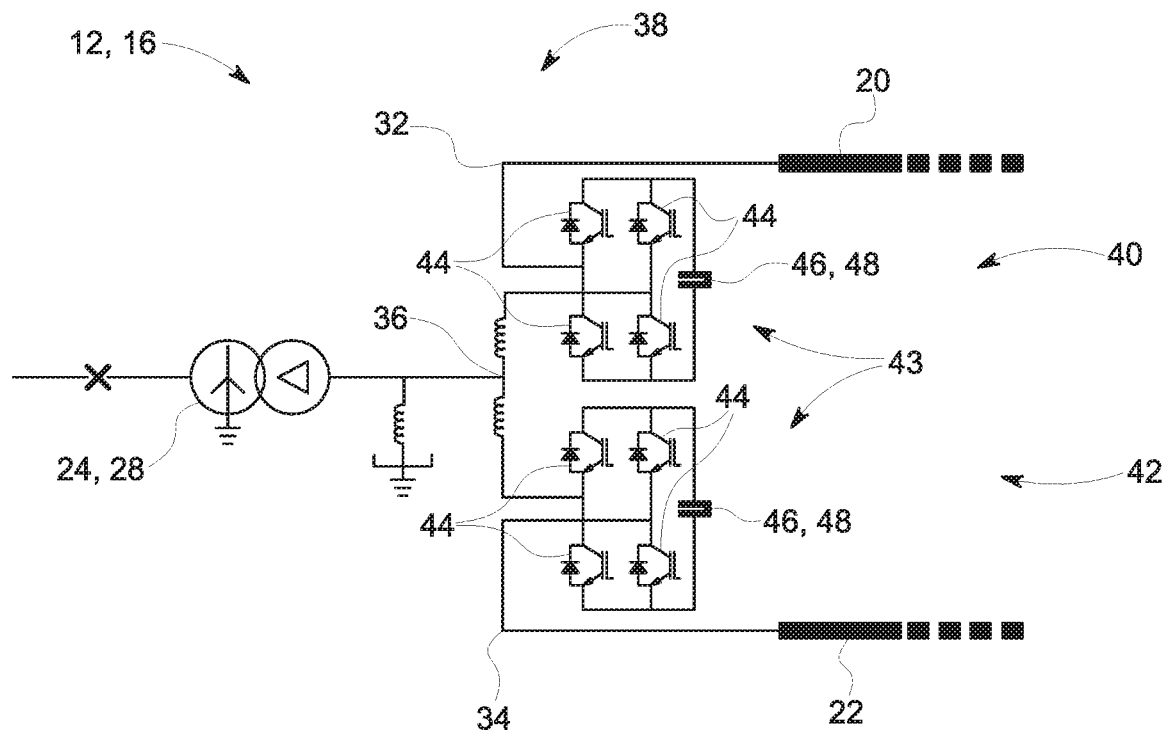
FIG. 2 shows a schematic view of a power converter forming part of the DC electrical network shown in FIG. 1.

Each of the first and third power converters 12, 16 is a voltage source converter that is connected between the corresponding AC network 24, 28 and the first DC electrical network 10 in a so-called "symmetrical monopole" configuration, which is illustrated schematically in FIG. 2.

Each such power converter 12, 16 includes a first DC terminal 32 that is operatively connected to the first DC power transmission medium 20, and a second DC terminal 34 that is operatively connected to the second DC power transmission medium 22.

In addition each power converter includes an AC terminal 36 which is connected to the corresponding AC network 24, 28.

The power converters 12, 16 also include a converter limb 38 that extends between the first and second DC terminals 32, 34 and, more particularly includes a first limb portion 40 that extends between the first DC terminal 32 and the AC terminal 36, and a second limb portion 42 which extends between the second DC terminal 34 and the AC terminal 36.

Each limb portion 40, 42 includes a plurality of series-connected modules 43 (for clarity only one module 43 is shown in FIG. 2 in each limb portion 28, 30).

In the specific arrangement shown, each module 43 includes two pairs of switching elements 44 which are connected in parallel with an energy storage device 46, e.g. a capacitor 48, in a full-bridge arrangement to define a 4-quadrant bipolar module that can provide a negative, zero or positive voltage source and can conduct current in two directions.

In other symmetrical monopole arrangements (not shown) the first and third power converters 12, 16 may include more than one converter limb 38, and in particular may include three converter limbs each of which is associated with a respective phase of a corresponding three phase AC electrical network.

When operating in a normal power transmission mode each of the first and third power converters 12, 16 generates a normal operating voltage difference, i.e. 100% V, between the first and second DC terminals 32, 34.

Each power converter 12, 16 generates such a normal operating voltage difference by setting the first DC terminal 32 to operate at a first normal operating voltage, e.g. +50% V, and the second DC terminal 34 to operate at a second normal operating voltage, e.g. −50% V.

Under such conditions, although the normal operating voltage difference between the first and second DC terminals 32, 34 is 100% V, the voltage potential with respect to earth at each of the first and second DC terminals 32, 34 is only 50% V, and so each of the respective DC power transmission mediums 20, 22, experiences a voltage level of only 50% V.

Thus the installation requirements for each of the DC power transmission mediums 20, 22 may be determined according to this lower level of voltage exposure.

Each of the second and fourth power converters 14, 18 is also a voltage source converter which is similarly connected between the DC electrical network 10 and the corresponding second and fourth AC electrical network 26, 30 in a symmetrical monopole configuration. In each instance this is essentially a mirror image of the configuration illustrated in FIG. 2.

In addition to the foregoing, one or more of the power converters 12, 14, 16, 18, but more particularly not all of the power converters 12, 14, 16, 18, may be designated as a re-energising power converter 62. Such a power converter helps to return the DC electrical network 10 to normal operation following a fault by re-energising the network 10, i.e. ramping the voltage level of each DC power transmission medium 20, 22 towards its normal operating level, i.e. +50% V for the first DC power transmission medium 20 and −50% V for the second DC power transmission medium 22.

In the network arrangement shown, each of the first and third power converters 12, 16 is designated as a re-energising power converter 62. This is desirable since each is located on-shore and is connected to a relatively strong, existing AC electrical network 24, 28.

Returning to the DC electrical network 10 shown in FIG. 1, the first DC power transmission medium 20 is formed from a plurality of interconnected first transmission lines 50 which are joined to one another in a conventional manner, such as via connections to a common busbar. Similarly the second DC power transmission medium 22 is formed from a plurality of interconnected second transmission lines 52 which are joined to one another in a similar manner.

Each of the first and second DC transmission mediums 20, 22 has corresponding first or second energy removal device 54, 56 operatively connected therewith. In the particular network arrangement shown the first DC power transmission medium 20 has two first energy removal devices 54 connected therewith, each of which is located adjacent to a corresponding first or third power converter 12, 16. Locating the first energy removal devices 54 in such a manner is convenient since typically it will mean that they are readily accessible, i.e. located on-shore, so as to permit easy maintenance and servicing. The second DC power transmission medium 22 similarly has two second energy removal devices 56 connected therewith, each of which is again located adjacent to a respective one of the first and third power converters 12, 16.

In the network arrangement shown, each of the energy removal devices 54, 56 takes the form of a shunt branch between the corresponding DC power transmission medium 20, 22 and earth 58. Each such shunt branch can be activated to add an additional load, e.g. a resistor, to the shunt branch so as to remove energy from the corresponding DC power transmission medium 20, 22, and thereby reduce the voltage level in the said DC power transmission medium 20, 22. Such shunt branches are additionally configured to provide active control of the voltage level. Energy removal devices 54, 56 of this type are typically known as Dynamic Breaking Resistors (DBRs), although other forms of energy removal device are also possible.

In addition to the foregoing the DC electrical network 10 includes a number of DC protection elements 60 located therethroughout. More particularly the various DC protection elements 60 are positioned within each DC power transmission medium 20, 22 so as permit the selective isolation, i.e. electrical separation, of a respective portion of a given DC power transmission medium 20, e.g. a faulty portion 62, from a remaining portion, e.g. a healthy remaining portion 64. A given arrangement of DC protection elements 60 is shown in FIG. 1 but other arrangements are also possible.

Each of the DC protection elements 60 may be a DC disconnector, a fast-operating disconnector, a power electronic switch, an AC circuit breaker, a HVDC circuit breaker or some other circuit separation device.

Figure 3A:
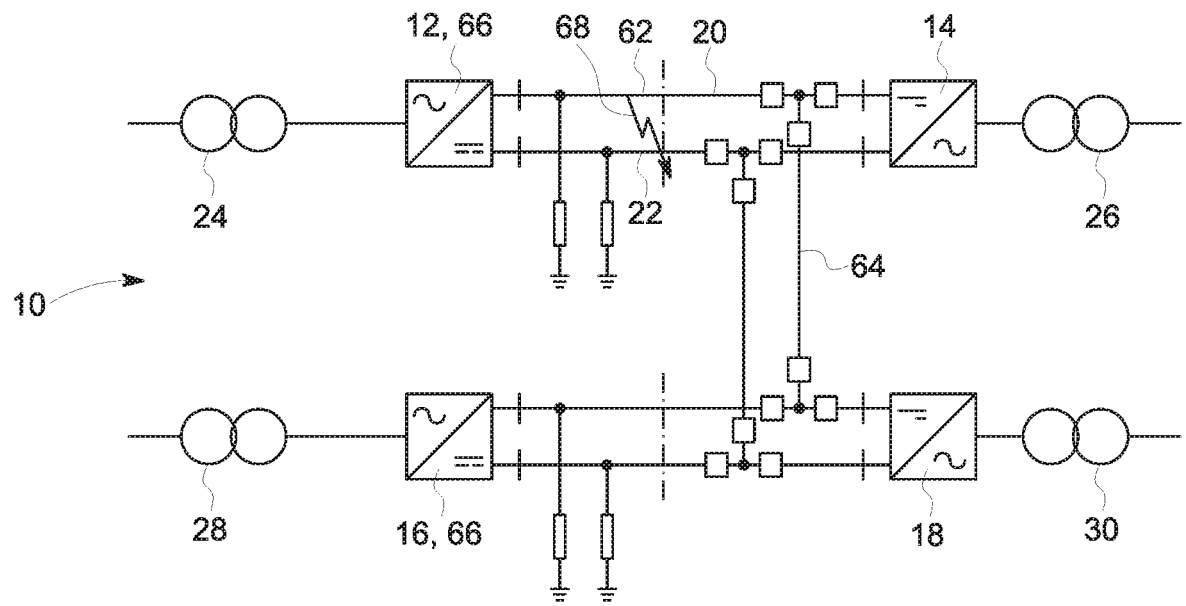
FIG. 3A illustrates occurrence of a first fault in the DC electrical network shown in FIG. 1.

A first type of fault 68 that can occur in the first DC electrical network 10 is a so-called line-to-ground fault, i.e. a short-circuit between one of the DC power transmission mediums 20, 22 and earth 58, as illustrated schematically in FIG. 3A. The first fault 68 is shown arising between the first DC power transmission medium 20 and earth 58, and in this instance the first DC power transmission medium 20 is designated according to whichever power transmission medium 20, 22 the first fault 68 arises in. In other words, in practice the first fault 68 can arise between either one of the DC power transmission mediums 20, 22 and earth 58, and whichever DC power transmission medium 20, 22 it does arise in connection with is considered to be the first DC power transmission medium 20.

A method of clearing such a fault according to an embodiment of the invention is described below, with additional reference to FIGS. 3B and 3C.

A first step in the method is to detect occurrence of the first fault 68, and in this instance includes detecting a difference in the voltage levels in each of the first and second DC power transmission mediums 20, 22. In this regard, as illustrated schematically in FIG. 3A, when the first fault 68 occurs in the first DC power transmission medium 20 the voltage level in the first DC power transmission medium 20 falls from a normal operating level of +50% V to zero, while the voltage level in the second DC power transmission medium 22 increases from a normal operating level of −50% V to a higher value which may be up to approximately −100% V.

Once a difference in voltage levels has been detected the next step in an embodiment of a method of the invention is to reconfigure each power converter 12, 14, 16, 18 from a normal power transmission mode to a fault blocking mode. In the fault blocking mode each power converter 12, 14, 16, 18 remains connected to the DC electrical network 10 and the corresponding AC electrical network 24, 26, 28, 30 but no longer permits the exchange of real power, i.e. energy, between the DC and AC networks 10, 24, 26, 28, 30. More particularly, in the fault blocking mode each power converter 12, 14, 16, 18 no longer permits the transfer of current from the associated AC network 24, 26, 28, 30 to the DC network 10. In some configurations the power converters 12, 14, 16, 18 are however still able to permit the exchange of reactive power between the networks.

Such blocking of the power converters 12, 14, 16, 18 drives the resulting DC fault current $I_{Fault}$ flowing in the first DC power transmission medium 20 towards zero, i.e. it begins to extinguish the DC fault current $I_{Fault}$.

After reconfiguring each of the power converters 12, 14, 16, 18 into a fault blocking mode, a method of embodiments of the invention includes the step of activating at least one of the second energy removal devices 56 that is connected with the second DC power transmission medium 22. This removes energy from the second DC power transmission medium 22, and thereby reduces the voltage level in the second DC power transmission medium 22 from the overvoltage level, i.e. −100% V, to a second threshold level which is below the normal operating voltage, i.e. below −50% V, of the second DC power transmission medium 22.

Once the voltage level in the second DC power transmission medium 22 has been reduced to the second threshold level, a method of embodiments of the invention includes the step of deactivating the or each said second energy removal device 56 for a predetermined period of time. In this context deactivating the or each said second energy removal device 56 means causing it to hold the voltage level in the second DC power transmission medium 22 at the second threshold level, i.e. not to further reduce the voltage level in the second DC power transmission medium 22.

In a method of embodiments of the invention the step of deactivating the or each said second energy removal device 56 coincides with the step of locating the first fault 68 in the first DC power transmission medium 20 and isolating a faulty portion 62 of the first DC power transmission medium 20 from a healthy remaining portion 64 of the first DC power transmission medium 20.

Locating the first fault 68 in the first DC power transmission medium 20 includes interrogating the plurality of DC protection elements 60 located throughout the first DC power transmission medium 20 by assessing the differential protection associated with the various DC protection elements 60.

Figure 3B:
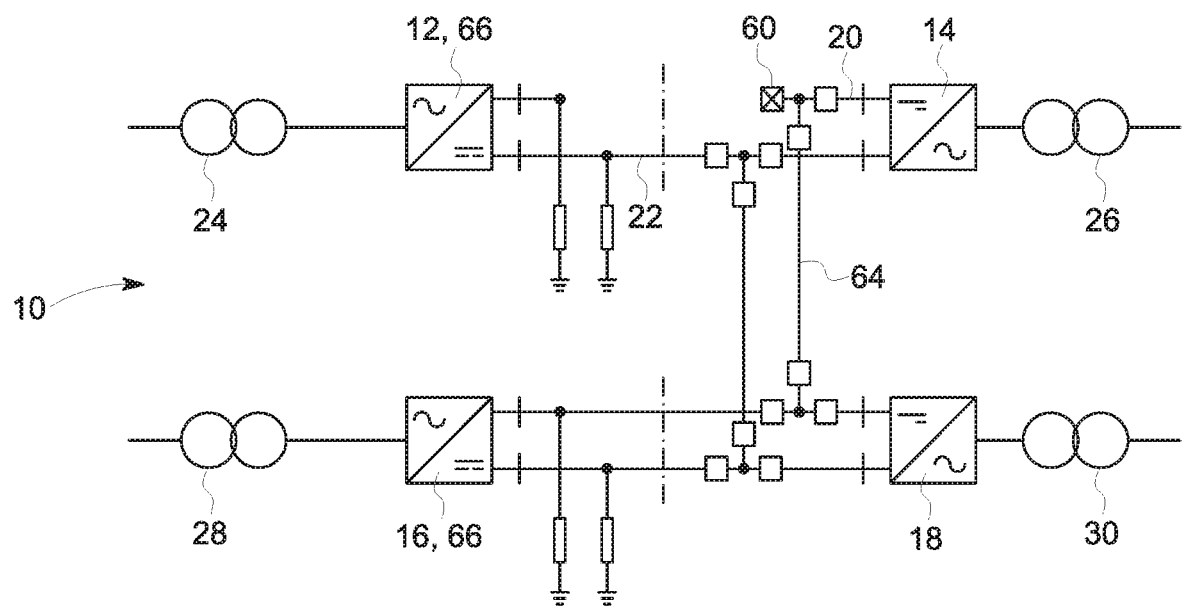
FIG. 3B illustrates a step in the method.

Meanwhile, isolating the faulty portion 62 of the first DC power transmission medium 20 from the healthy remaining portion 64 includes operating a DC protection element 60 located adjacent to the faulty portion 62 to electrically separate the said faulty portion 62 of the first DC power transmission medium 20 from the healthy remaining portion 64, as illustrated schematically in FIG. 3B.

Such operation of the DC protection element 60 takes place once the DC fault current $I_{Fault}$ flowing through the first DC power transmission medium 20 has been driven down by the fault-blocking power converters 12, 14, 16, 18 below a safety threshold level.

Figure 3C:
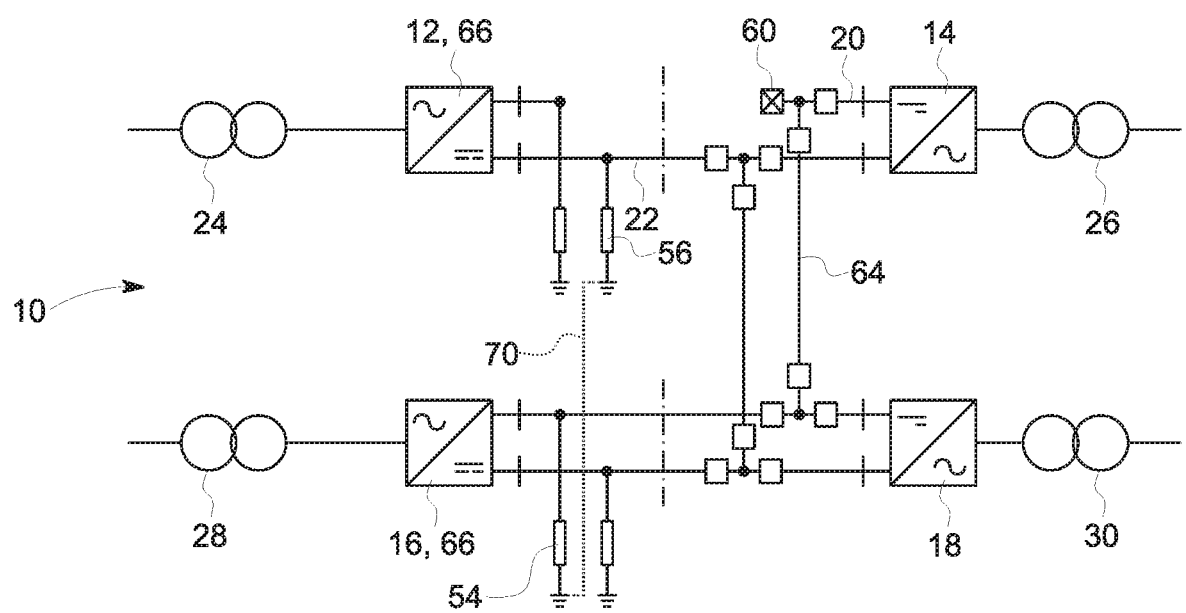
FIG. 3C illustrates a further step in the method.

Once the first fault 68 has been located and isolated from the healthy remaining portion 64 of the first DC power transmission medium 20, and the or each said second energy removal device 56 has been deactivated for the predetermined period of time, a method of embodiments of the invention then includes the step of selectively activating at least one of the first energy removal devices 54 connected with the first DC power transmission medium 20 and selectively activating at least one of the second energy removal devices 56 connected with the second DC power transmission medium 20 to selectively interconnect the first and second DC power transmission mediums 20, 22, as illustrated schematically in FIG. 3C. Such interconnection of the first and second DC power transmission mediums 20, 22 provides a path 70 via which the voltage levels in the first and second DC power transmission mediums 20, 22 are able to rebalance.

Once a rebalance of the voltage levels in the first and second DC power transmission mediums 20, 22 has been detected, a method of embodiments of the invention then includes the step of reconfiguring a designated re-energising power converter 66 from the fault blocking mode to a re-energising mode.

In the example method illustrated, the location of the first fault 68, and its subsequent isolation from the healthy remaining portion 64 of the first DC power transmission medium 20, results in the first power converter 12, i.e. a first of the designated re-energising power converters 66, being partially disconnected from the first DC electrical network 10. As such it is not suitable, in this instance, for re-energising the healthy remaining portion 64 of the first DC power transmission medium 20, and so the third power converter 16, i.e. a second designated re-energising power converter 66, is instead reconfigured into the re-energising mode in order to re-energise the healthy remaining portion 64 of the first DC power transmission medium 20, and also the completely healthy second DC power transmission medium 22. Re-energising the said power transmission mediums 20, 22 involves the re-energising power converter 66 ramping up the voltage level in each of the power transmission mediums 20, 22.

Thereafter a method of embodiments of the invention requires the step of detecting a rise in the voltage level in the healthy remaining portion 64 of the first DC power transmission medium 20 above a first threshold level which is, in the example embodiment described herein, below the normal operating level, i.e. below +50% V, of the first DC power transmission medium 20, but above the second threshold level mentioned hereinabove.

In response to detecting the rise in the voltage level in the healthy remaining portion 64 of the first DC power transmission medium 20 above the first threshold level, a method of embodiments of the invention then carries out the step of reconfiguring each of the remaining power converters which continue to be connected with the healthy remaining portion 64 of the first DC power transmission medium 20, i.e. the second and fourth power converters 14, 18, from the fault blocking mode to their normal power transmission mode such that the first DC electrical network 10 is again able to transfer real power.

Figure 4A:
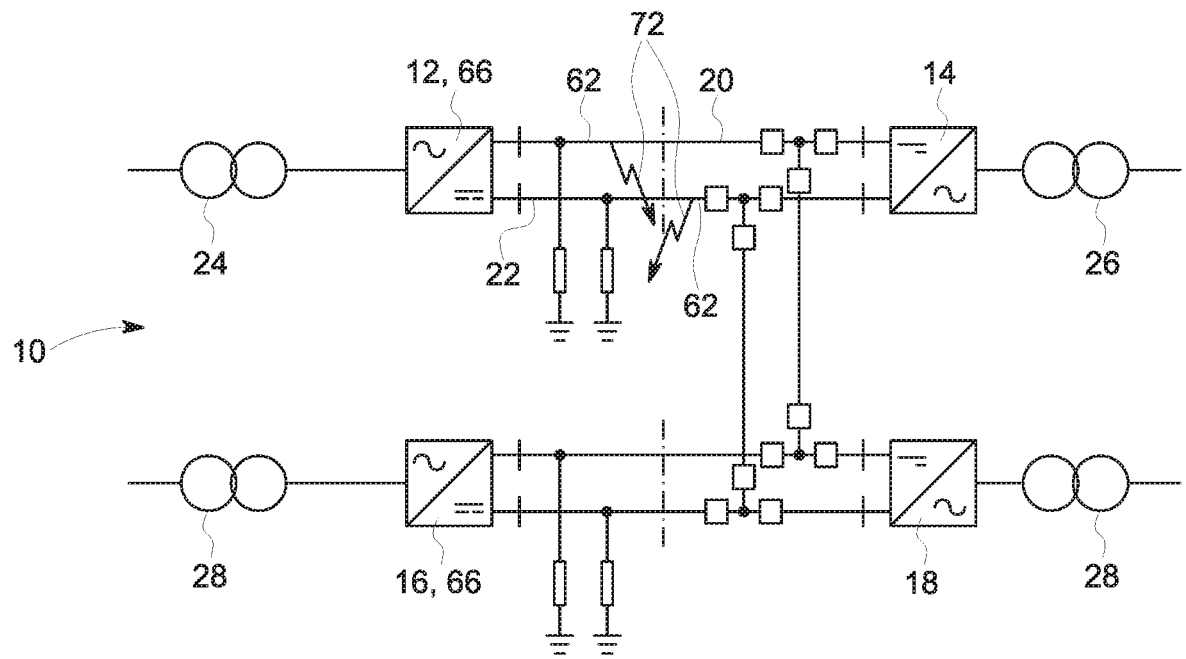
FIG. 4A illustrates occurrence of a second fault in the DC electrical network shown in FIG. 1.

A second type of fault 72 that can occur in the first DC electrical network 10 is a so-called line-to-ground-to-line fault, i.e. a short-circuit between each of the DC power transmission mediums 20, 22 and earth 58, as illustrated schematically in FIG. 4A, or a short-circuit directly between the first and second DC power transmission mediums 20, 22.

A method of clearing such a fault according to an embodiment of the invention is described below, with additional reference to FIG. 4B.

A first step in the second method is to detect occurrence of the second fault 72 which includes detecting a rise in current flowing in each of the first and second DC power transmission mediums 20, 22.

Once such a rise in current has been detected the next step in a method of embodiments of the invention is again to reconfigure each power converter 12, 14, 16, 18 from its normal power transmission mode to a fault blocking mode which is essentially identical to that described above in connection with the first method of embodiments of the invention.

Such blocking of the power converters 12, 14, 16, 18 similarly drives the resulting DC fault current $I_{Fault}$ flowing in each of the first and second DC power transmission mediums 20, 22 towards zero, i.e. it again begins to extinguish the DC fault currents $I_{Fault}$.

After reconfiguring each of the power converters 12, 14, 16, 18 into a fault blocking mode, a method of embodiments of the invention includes the step of locating the second fault 72 in each of the first and second DC power transmission mediums 20, 22 and isolating a faulty portion 62 of the corresponding first or second DC power transmission medium 20, 22 from a healthy remaining portion 64 thereof.

Locating the second fault 72 in each DC power transmission medium 20, 22 again includes interrogating the plurality of DC protection elements 60 located throughout the first and second DC power transmission mediums 20, 22 by assessing the differential protection associated with the various DC protection elements 60.

Figure 4B:
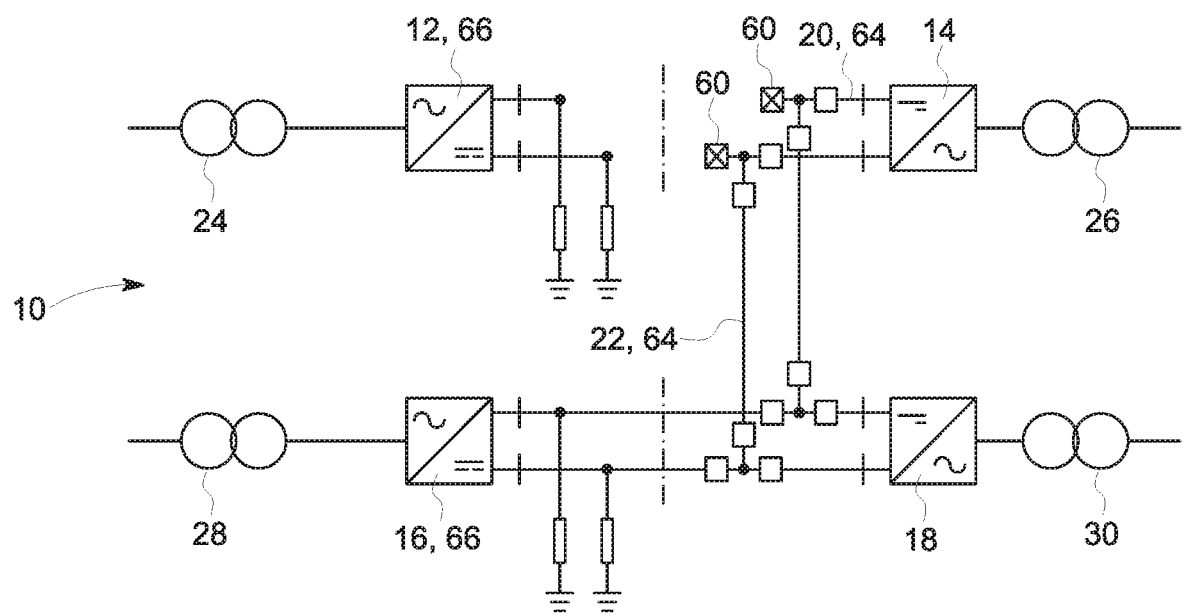
FIG. 4B illustrates a step in the method.

Meanwhile, isolating the faulty portion 62 of the first DC power transmission medium 20 from the healthy remaining portion 64 similarly includes operating a DC protection element 60 located adjacent to the faulty portion 62 to electrically separate the said faulty portion 62 of the first DC power transmission medium 20 from the healthy remaining portion 64, as illustrated schematically in FIG. 4B.

Such isolation also, additionally, includes the step of isolating a faulty portion 62 of the second DC power transmission medium 22 from a healthy remaining portion 64 of the second DC power transmission medium 22. Such isolation is again achieved by operating at least one DC protection element 60 that lies adjacent to the said faulty portion 62 of the second DC power transmission medium 22 to electrically separate the said faulty portion 62 from the healthy remaining portion 64 of the second DC power transmission medium 22, again as illustrated schematically in FIG. 4B.

Such operation of the DC protection elements 60 similarly takes place once the DC fault current $I_{Fault}$ flowing through each DC power transmission medium 20, 22 has been driven down by the fault-blocking power converters 12, 14, 16, 18 below the safety threshold level.

A method of embodiments of the invention then includes, a predetermined period of time after the second fault 72 has been located, the step of reconfiguring a designated re-energising power converter 66 from the fault blocking mode to a re-energising mode.

In the example method illustrated, the location of the second fault 72, and its subsequent isolation from the respective healthy remaining portion 64 of the first and second DC power transmission mediums 20, 22, again results in the first power converter 12 being disconnected from the first DC electrical network 10. As such it is again not suitable, in this instance, for re-energising the healthy remaining portion 64 of the first and second DC power transmission mediums 20, 22, and so the third power converter 16 is reconfigured into the re-energising mode in order to re-energise the respective healthy remaining portions 64 of the first and second DC power transmission mediums 20, 22.

Thereafter a method of embodiments of the invention requires the step of detecting a rise in the voltage level in the healthy remaining portion 64 of the first DC power transmission medium 20 above a first threshold level which is below the normal operating level, i.e. below +50% V, of the first DC power transmission medium 20.

In response to detecting the rise in the voltage level in the healthy remaining portion 64 of the first DC power transmission medium 20 above the first threshold level, a method of embodiments of the invention then carries out the step of reconfiguring each of the remaining power converters which continue to be connected with the healthy remaining portion 64 of the first DC power transmission medium 20, i.e. the second and fourth power converters 14, 18, from the fault blocking mode to their normal power transmission mode such that the first DC electrical network 10 is again able to transfer real power.

Figure 5:
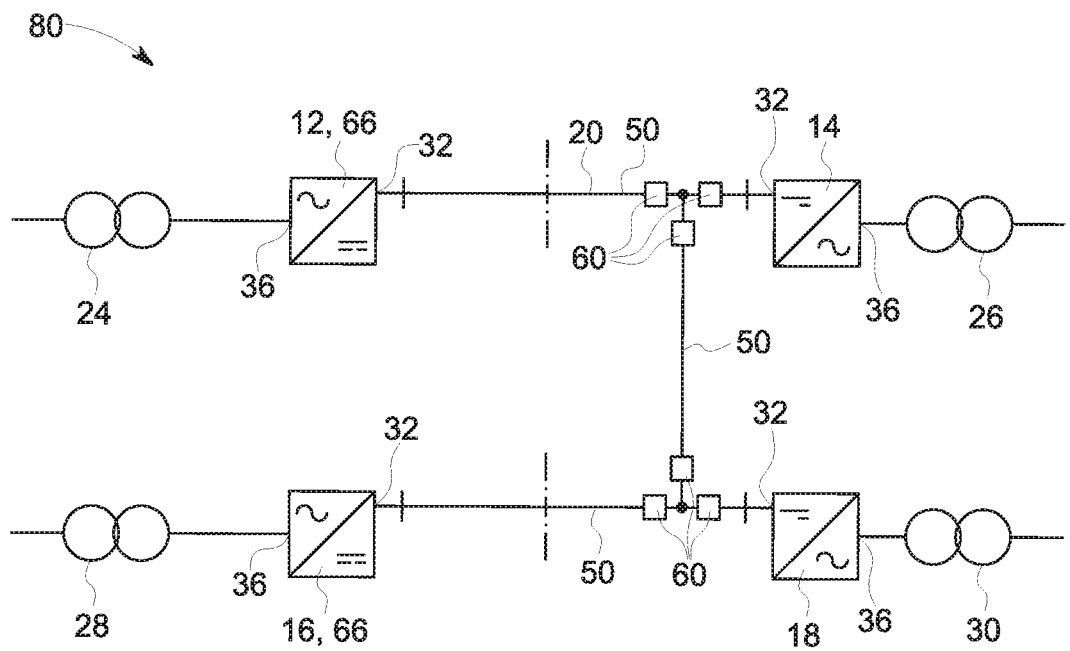
FIG. 5 shows a schematic view of a second DC electrical network in respective of which a method is applicable.

A second DC electrical network is designated generally by reference numeral 80, as shown in FIG. 5.

The second DC electrical network 10 is similar to the first DC electrical network 10 and like features share the same reference numerals.

Figure 6:
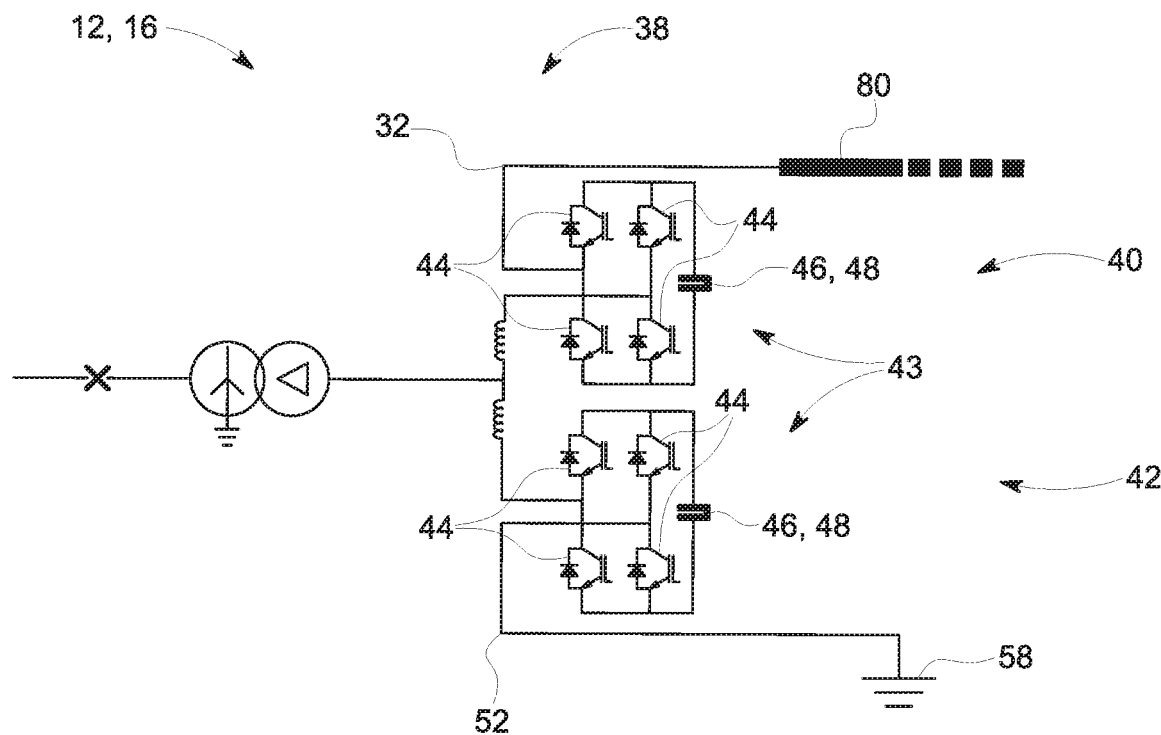
FIG. 6 shows a schematic view of a power converter forming part of the DC electrical network shown in FIG. 5.

However, the second DC electrical network 80 differs from the first DC electrical network 10 in that each of the first and third power converters 12, 16 is a voltage source converter that is connected between the corresponding AC network 24, 28 and the second DC electrical network 80 in a so-called "asymmetric monopole" configuration, which is illustrated schematically in FIG. 6.

Such a configuration means that each voltage source converter includes a second terminal 82 which rather than being operatively connected to a second DC power transmission medium is instead operatively connected to earth 58, either directly or via a line or cable.

The voltage source converters are otherwise identical to those described hereinabove in connection with the first DC electrical network 10, and can similarly include different numbers and configurations of modules 43, as well as a different number of converter limbs 38.

When operating in a normal power transmission mode the voltage source converters in the second DC electrical network 80 generate a normal operating voltage difference, i.e. 100% V, between their first DC terminal 32 and their second terminal 82.

In this instance the voltage potential at the first DC terminal 32 is 100% V and so greater insulation requirements arise in respect of the first DC power transmission medium 20.

Each of the second and fourth power converters 14, 18 in the second DC electrical network 80 is also a voltage source converter which is similarly connected between the second DC electrical network 80 and the corresponding second and fourth AC electrical network 26, 30 in an asymmetric monopole configuration which, in each instance, is again essentially a mirror image of the configuration illustrated in FIG. 6.

Returning to the second DC electrical network 80 shown in FIG. 5, a further way in which it differs from the first DC electrical network 10 arises from the asymmetric monopole configuration of each of the power converters 12, 14, 16, 18 in so far as they are interconnected with one another only by a first high voltage DC power transmission medium 20.

Figure 7A:
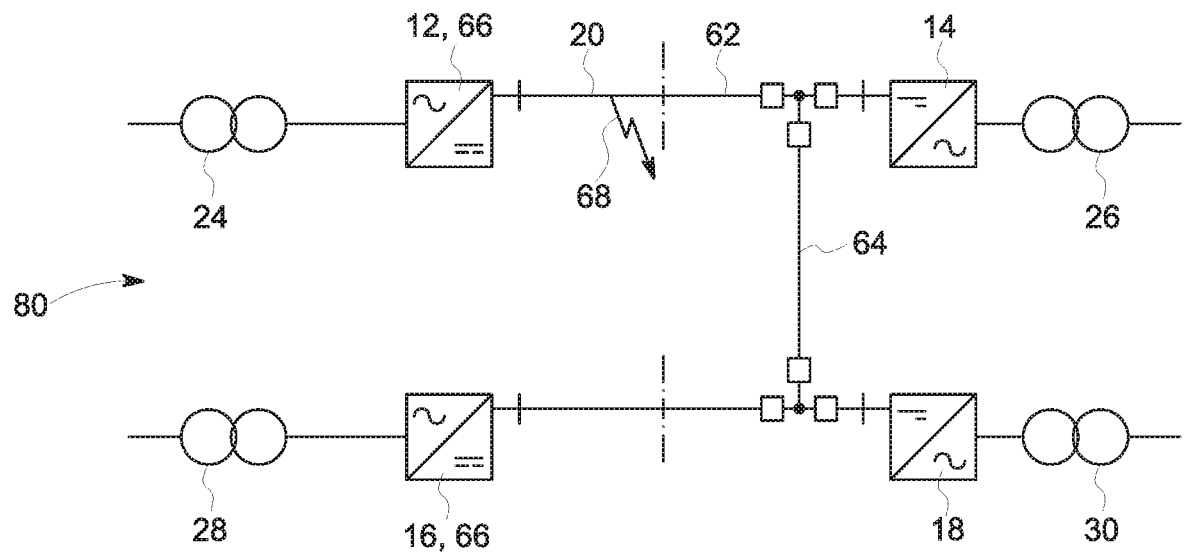
FIG. 7A illustrates occurrence of a first fault in the DC electrical network shown in FIG. 5.

A first fault 68, i.e. a line-to-ground fault, can also occur in the second DC electrical network 80, as illustrated schematically in FIG. 7A.

A method of clearing such a fault according to an embodiment of the invention is described below, with additional reference to FIG. 7B. This method of embodiments of the invention is similar to the second method of embodiments of the invention.

A first step in the third method is to detect occurrence of the first fault 68 in the second DC electrical network 80, and this includes detecting a rise in current flowing in the first DC power transmission medium 20. The rise in current indicating a fault may be detected by directly monitoring the current flowing in the first DC power transmission medium 20, or by observing a collapse in the voltage of the DC power transmission medium 20.

Once such a rise in current has been detected the next step in the method of embodiments of the invention is again to reconfigure each power converter 12, 14, 16, 18 from its normal power transmission mode to a fault blocking mode which is essentially identical to that described above in connection with the first and second embodiments of methods of the invention.

Such blocking of the power converters 12, 14, 16, 18 similarly drives the resulting DC fault current $I_{Fault}$ flowing in the first DC power transmission medium 20 towards zero, i.e. it again begins to extinguish the DC fault current $I_{Fault}$.

After reconfiguring each of the power converters 12, 14, 16, 18 into a fault blocking mode, the method of embodiments of the invention includes the step of locating the first fault 68 in the first DC power transmission medium 20 and isolating a faulty portion 62 of the first DC power transmission medium 20 from a healthy remaining portion 64 thereof.

Locating the first fault 68 in the first DC power transmission medium 20 again includes interrogating the plurality of DC protection elements 60 located throughout the first DC power transmission medium 20 by assessing the differential protection associated with the various DC protection elements 60.

Figure 7B:
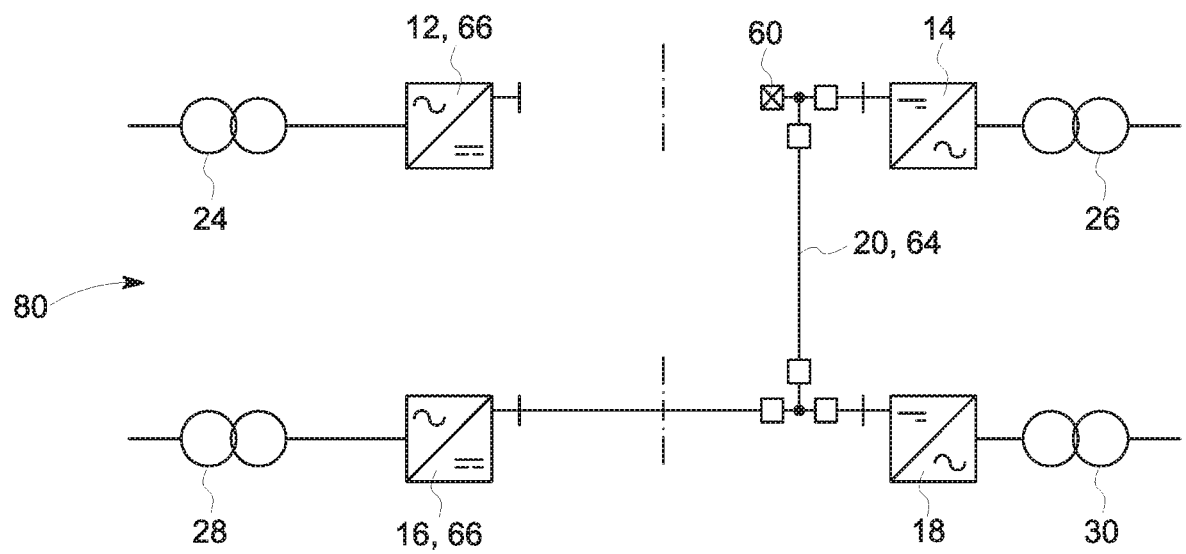
FIG. 7B illustrates a step in the method.

Meanwhile, isolating the faulty portion 62 of the first DC power transmission medium 20 from the healthy remaining portion 64 similarly includes operating a DC protection element 60 located adjacent to the faulty portion 62 to electrically separate the said faulty portion 62 of the first DC power transmission medium 20 from the healthy remaining portion 64, as illustrated schematically in FIG. 7B.

Such operation of the DC protection element 60 similarly takes place once the DC fault current $I_{Fault}$ flowing through the first DC power transmission medium 20 has been driven down by the fault-blocking power converters 12, 14, 16, 18 below the safety threshold level.

The method of embodiments of the invention then includes, a predetermined period of time after the first fault 68 in the second DC electrical network 80 has been located, the step of reconfiguring a designated re-energising power converter 66 from the fault blocking mode to a re-energising mode.

In the example method illustrated, the location of the first fault 68, and its subsequent isolation from the healthy remaining portion 64 of the first DC power transmission medium 20 again results in the first power converter 12 being disconnected from the first DC electrical network 10. As such it is again not suitable for re-energising the healthy remaining portion 64 of the first DC power transmission medium 20, and so the third power converter 16 is reconfigured into the re-energising mode in order to re-energise the healthy remaining portion 64 of the first DC power transmission medium 20.

The method of embodiments of the invention then requires the step of detecting a rise in the voltage level in the healthy remaining portion 64 of the first DC power transmission medium 20 above a first threshold level which is below the normal operating level, i.e. below +100% V, of the first DC power transmission medium 20.

In response to detecting the rise in the voltage level in the healthy remaining portion 64 of the first DC power transmission medium 20 above the first threshold level, the method of embodiments of the invention then similarly carries out the step of reconfiguring each of the remaining power converters which continue to be connected with the healthy remaining portion 64 of the first DC power transmission medium 20, i.e. the second and fourth power converters 14, 18, from the fault blocking mode to their normal power transmission mode such that the second DC electrical network 80 is again able to transfer real power.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of clearing a fault in a high voltage DC electrical network including at least three power converters interconnected by at least a first DC power transmission medium, the method comprising:
   detecting a fault in the first DC power transmission medium and in response reconfiguring each power converter from a normal power transmission mode to a fault blocking mode to drive the resulting DC fault current flowing in the first DC power transmission medium towards zero;
   locating the fault in the first DC power transmission medium and isolating a faulty portion of the first DC power transmission medium from a healthy remaining portion of the first DC power transmission medium;
   reconfiguring at least one of the power converters designated as a re-energising power converter from the fault blocking mode to a re-energising mode to re-energise the healthy remaining portion of the first DC power transmission medium; and
   detecting a rise in the voltage level with respect to earth in the healthy remaining portion of the first DC power transmission medium above a first threshold level and in response reconfiguring the remaining power converter connected with the healthy remaining portion of the first DC power transmission medium from the fault blocking mode to the normal power transmission mode.

2. The method of clearing a fault according to claim 1, wherein the at least three power converters are interconnected by first and second DC power transmission mediums, and wherein the step of detecting a fault in the first DC power transmission medium includes detecting a difference between the voltage levels in each of the first and second DC power transmission mediums.

3. The method of clearing a fault according to claim 1, wherein the at least three power converters are interconnected by first and second DC power transmission mediums, and wherein the step of detecting a fault in the first DC power transmission medium includes detecting a rise in current flowing in each of the first and second DC power transmission mediums.

4. The method of clearing a fault according to claim 1, wherein the at least three power converters are interconnected by only a first DC power transmission medium, and wherein the step of detecting a fault in the first DC power transmission medium includes detecting a rise in current flowing in the first DC power transmission medium.

5. The method of clearing a fault according to claim 2, wherein each of the first and second DC power transmission mediums has at least one energy removal device connected therewith, and wherein after the step of reconfiguring each power converter from the normal power transmission mode to the fault blocking mode to drive the resulting DC fault current flowing in the first DC power transmission medium towards zero, the method includes the step of activating at least one of the energy removal devices connected with the second DC power transmission medium to remove energy from the second DC power transmission medium and thereby reduce the voltage level in the second DC power transmission medium from an overvoltage level following occurrence of the fault to a second threshold level below a normal absolute operating voltage level of the second DC power transmission medium.

6. The method of clearing a fault according to claim 5, wherein the second threshold level is additionally below the first threshold level.

7. The method of clearing a fault according to claim 5 wherein after the step of activating at least one of the energy removal devices connected with the second DC power transmission medium, the method includes the step of deactivating the said energy removal device for a predetermined period of time, the deactivation of the said energy removal device coinciding at least in part with the step of locating the fault in the first DC power transmission medium and isolating the faulty portion of the first DC power transmission medium from the healthy remaining portion of the first DC power transmission medium.

8. The method of clearing a fault according to claim 7, wherein the step of deactivating the said energy removal device connected with the second DC power transmission medium for a predetermined period of time, is followed by the step of selectively activating at least one of the energy removal devices connected with the first DC power transmission medium and selectively activating at least one of the energy removal devices connected with the second DC power transmission medium to selectively interconnect the first and second DC power transmission mediums and thereby provide a path via which the voltage levels in the first and second DC power transmission mediums are able to rebalance.

9. The method of clearing a fault according to claim 8, wherein the step of reconfiguring at least one of the power converters designated as a re-energising power converter from the fault blocking mode to the re-energising mode takes place on detection of balanced voltage levels in the first and second DC power transmission mediums.

10. The method of clearing a fault according to claim 3, wherein the step of reconfiguring at least one of the power converters designated as a re-energising power converter from the fault blocking mode to a re-energising mode takes place a predetermined period of time after the fault is detected.

11. The method of clearing a fault according to claim 1 wherein the step of locating a fault in the first DC power transmission medium includes interrogating a plurality of DC protection elements located throughout the electrical network, the DC protection elements being so located throughout the electrical network so as to permit the selective isolation of respective portions of a given DC power transmission medium from one another.

12. The method of clearing a fault according to claim 1, wherein the step of isolating a faulty portion of the first DC power transmission medium from the healthy remaining portion of the first DC power transmission medium includes the step of operating at least one DC protection element lying adjacent to the faulty portion to electrically separate the said faulty portion from the healthy remaining portion.

13. The method of clearing a fault according to claim 12, wherein the step of isolating a faulty portion of the first DC power transmission medium from the healthy remaining portion of the first DC power transmission medium additionally includes the step of isolating a faulty portion of the second DC power transmission medium from a healthy remaining portion of the second DC power transmission medium by operating at least one DC protection element lying adjacent to the said faulty portion of the second DC power transmission medium to electrically separate the said faulty portion from the healthy remaining portion of the second DC power transmission medium.

14. The method of clearing a fault according to claim 12 wherein operating the said DC protection device takes place once the DC fault current flowing through the corresponding DC power transmission medium has been driven down by the fault-blocking power converters below a safety threshold level.

* * * * *